US009810524B2

(12) United States Patent
Reese et al.

(10) Patent No.: US 9,810,524 B2
(45) Date of Patent: Nov. 7, 2017

(54) POWER TOOL WITH OPTICAL MEASUREMENT DEVICE

(71) Applicant: Sears Brands, L.L.C., Hoffman Estates, IL (US)

(72) Inventors: Brian Todd Reese, St. Charles, IL (US); Cody Lyle Mayer, Chicago, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 0 days.

(21) Appl. No.: 14/970,047

(22) Filed: Dec. 15, 2015

(65) Prior Publication Data

US 2017/0167855 A1    Jun. 15, 2017

(51) Int. Cl.
| | | |
|---|---|---|
| *G01B 11/14* | (2006.01) | |
| *B23D 59/00* | (2006.01) | |
| *B23Q 17/24* | (2006.01) | |
| *G01B 11/02* | (2006.01) | |

(52) U.S. Cl.
CPC ............ *G01B 11/14* (2013.01); *B23D 59/001* (2013.01); *B23D 59/008* (2013.01); *B23Q 17/2471* (2013.01); *G01B 11/026* (2013.01)

(58) Field of Classification Search
CPC .. B23D 45/068; B23D 59/002; B23D 59/001; B23D 59/008; B27G 19/02; Y10T 83/7726
USPC .................................................. 356/601–621
See application file for complete search history.

(56) References Cited

U.S. PATENT DOCUMENTS

| | | | |
|---|---|---|---|
| 4,908,953 A | 3/1990 | Wallisser | |
| 5,205,049 A | 4/1993 | Rieder et al. | |
| 7,580,804 B2 | 8/2009 | Wixey | |
| 2003/0197138 A1 | 10/2003 | Pease et al. | |
| 2004/0215414 A1 | 10/2004 | Kaisser | |
| 2006/0101960 A1* | 5/2006 | Smith ................. | B23D 59/001 83/58 |
| 2010/0037739 A1* | 2/2010 | Anderson ............ | B23D 59/001 83/58 |
| 2010/0064869 A1 | 3/2010 | Poole | |
| 2010/0152882 A1 | 6/2010 | Krapf et al. | |
| 2011/0226105 A1* | 9/2011 | Butler .................... | B27B 5/222 83/62 |
| 2014/0130643 A1* | 5/2014 | Dammertz ............ | B27G 19/02 83/13 |

(Continued)

OTHER PUBLICATIONS

U.S. Appl. No. 14/543,501, filed Nov. 17, 2014, titled "Onboard Measuring System for Miter Saws", 28 pages.

(Continued)

*Primary Examiner* — Tarifur Chowdhury
*Assistant Examiner* — Isiaka Akanbi
(74) *Attorney, Agent, or Firm* — McAndrews, Held & Malloy, Ltd.

(57) ABSTRACT

Various embodiments of tools with associated optical measurement devices are described. An apparatus may include a tool to be applied to a workpiece, an optical measurement device in a feed path of the tool, and a controller. The optical measurement device may generate displacement measurements indicative of displacement of the workpiece as the workpiece traverses the feed path toward the tool. The controller may generate a measurement of the workpiece based on the plurality of displacement measurements.

18 Claims, 6 Drawing Sheets

(56) References Cited

U.S. PATENT DOCUMENTS

2014/0318342 A1* 10/2014 Koegel ............... B23D 45/068
83/477.1
2015/0246399 A1   9/2015 Knight et al.

OTHER PUBLICATIONS

"The Optical Mouse As A Two-Dimensional Displacement Sensor", Science Direct, Jun. 2003, 5 pages.
Extended European Search Report for EP16204082, dated Apr. 20, 2017, 9 pages.

* cited by examiner

POWER TOOL WITH OPTICAL MEASUREMENT DEVICE

FIELD OF THE INVENTION

Various embodiments relate to measuring a workpiece, and more particularly, to power tools with optical measurement devices.

BACKGROUND OF THE INVENTION

When power tools are used, a workpiece is typically measured and appropriately marked at a desired location. The operator of the power tool may reference the applied mark when determining where to apply the power tool to the workpiece. The process is often cumbersome requiring the operator to hold the workpiece, manipulate a measurement device with respect to the workpiece, and mark the workpiece at a desired location. To make matters worse, common practice is to measure at least twice before applying a power tool to the desired location to ensure that the measuring and marking process was completed accurately. While such measuring techniques reduce the likelihood of error, such measuring techniques also increase the time needed to perform the operation. Such measuring techniques also cause the user to endure the cumbersome practice at least twice for each measurement. Thus, many people find current measuring techniques to be time consuming, error prone, and cumbersome.

Limitations and disadvantages of conventional and traditional approaches should become apparent to one of skill in the art, through comparison of such systems with aspects of the embodiments set forth in the remainder of the present application.

BRIEF SUMMARY OF THE INVENTION

Optical measurement techniques and apparatus incorporating such optical measurement techniques are substantially shown in and/or described in connection with at least one of the figures, and are set forth more completely in the claims.

Advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

DETAILED DESCRIPTION OF THE INVENTION

Aspects of the present invention are generally related to optical measurement devices and more specifically to power tools comprising optical measurement devices. The following description focuses upon an embodiment of a power tool in the form of a miter saw having a blade for cutting a workpiece. However, various aspects of the disclosed measurement devices may be applicable to a wide range of power tools such as circular saws, table saws, scroll saws, jigsaws, drill presses, routers, router tables, planers, shapers, etc., that include a blade, drill bit, or other tool applied to a workpiece.

As explained in greater detail below, the optical measurement device may eliminate the conventional measurement and marking process for some applications. For example, the optical measurement device may enable the operator to directly move the workpiece to a desired position relative to a tool (e.g., cutting blade, drill bit, etc.) to be applied to the workpiece. To this end, the optical measurement device may be positioned in the feed path of the tool (e.g., integrated into a deck, fence, housing, etc., of the tool) such that the optical measurement device may measure the workpiece as it travels the feed path and traverses the optical measurement device. The traveled distance, relative to the applied tool, may be visually displayed via an integrated display of the power tool or a display remote from the power tool. After the operator determines, based on the displayed measurement, that the tool is positioned at a desired location of the workpiece, the operator may hold the workpiece in place and apply the tool to the workpiece at the desired location.

Figure 1:
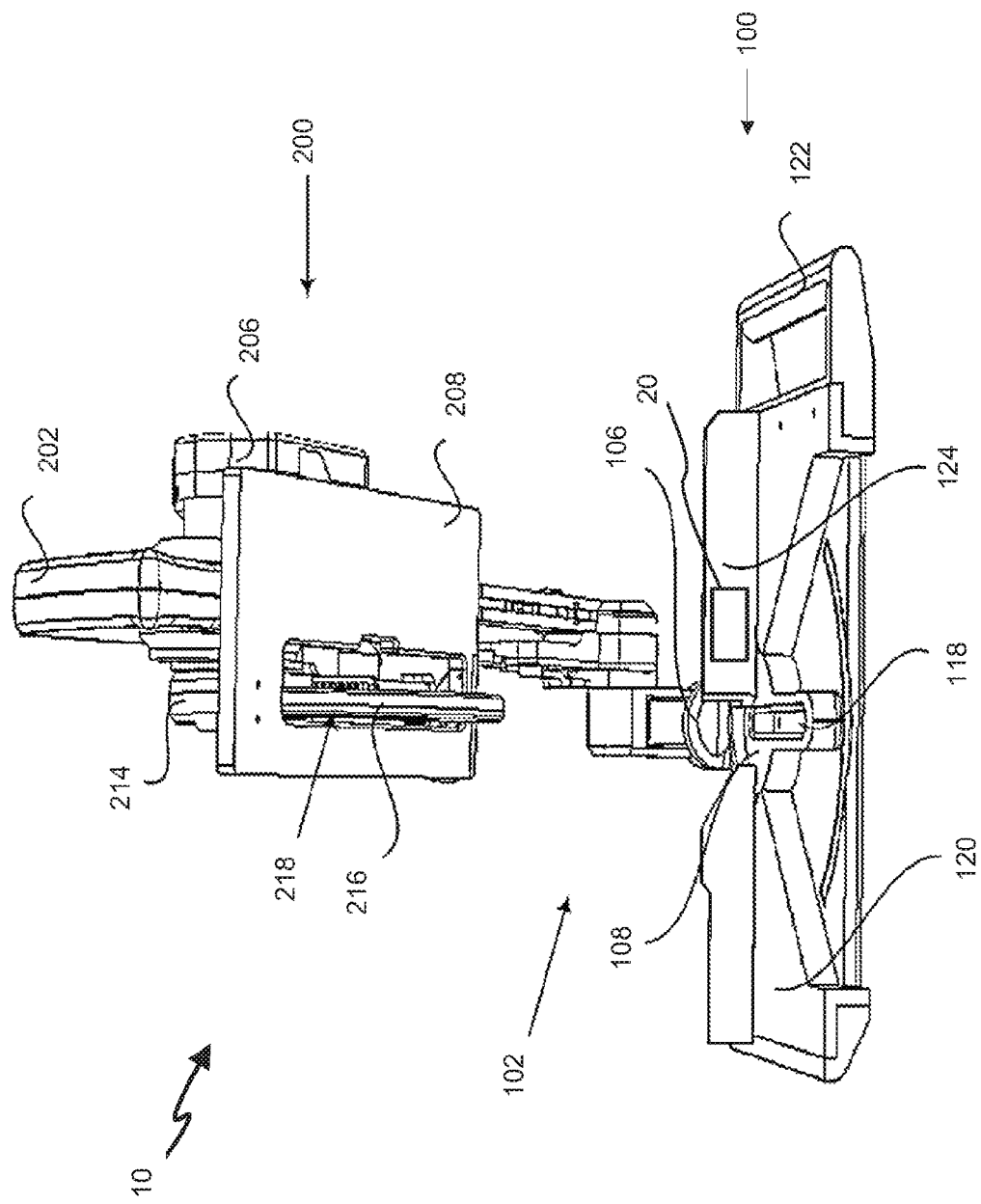
FIGS. 1-3 provide a perspective views of a power tool in accordance with one embodiment.
Figure 2:
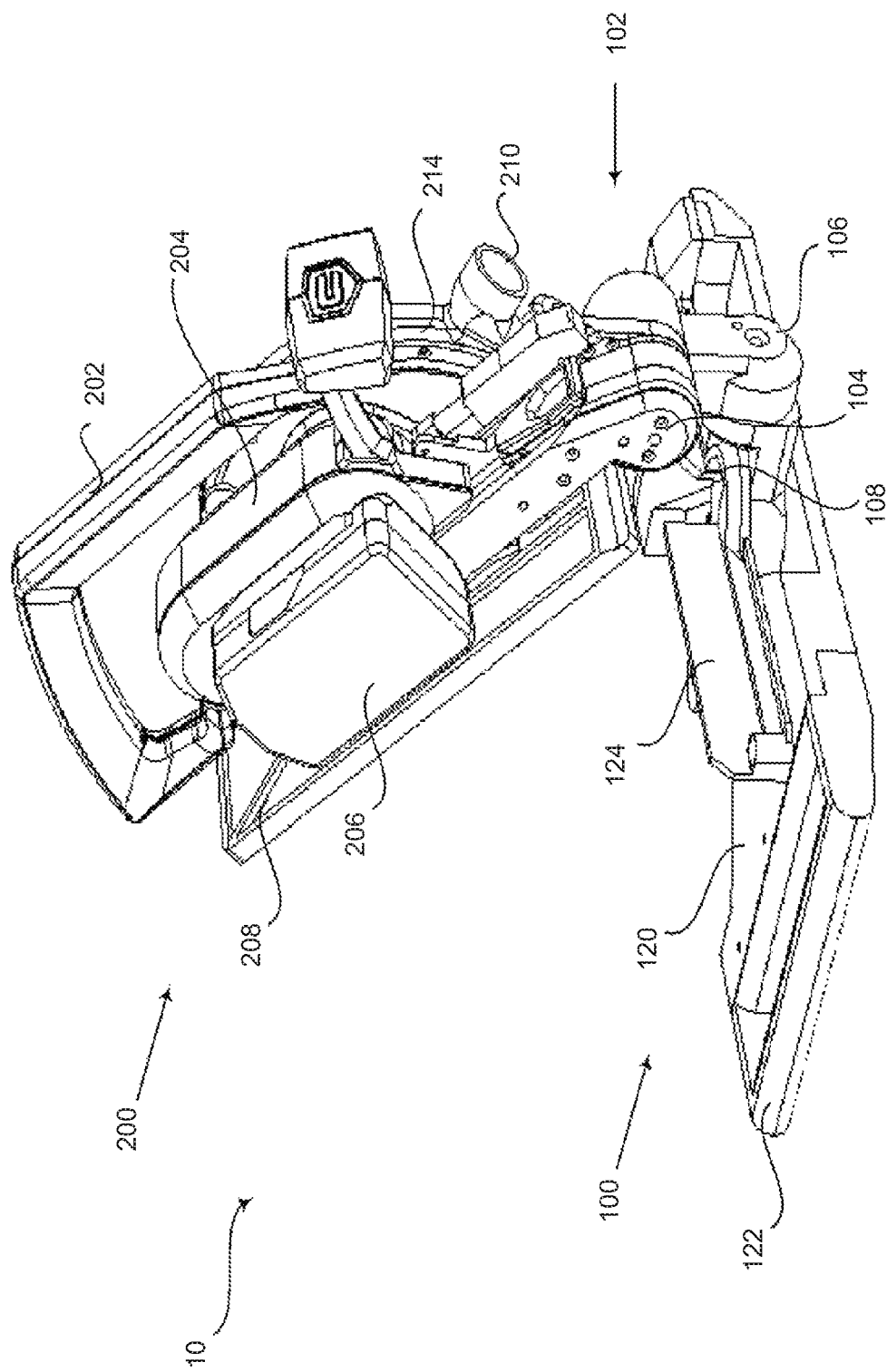
Figure 3:
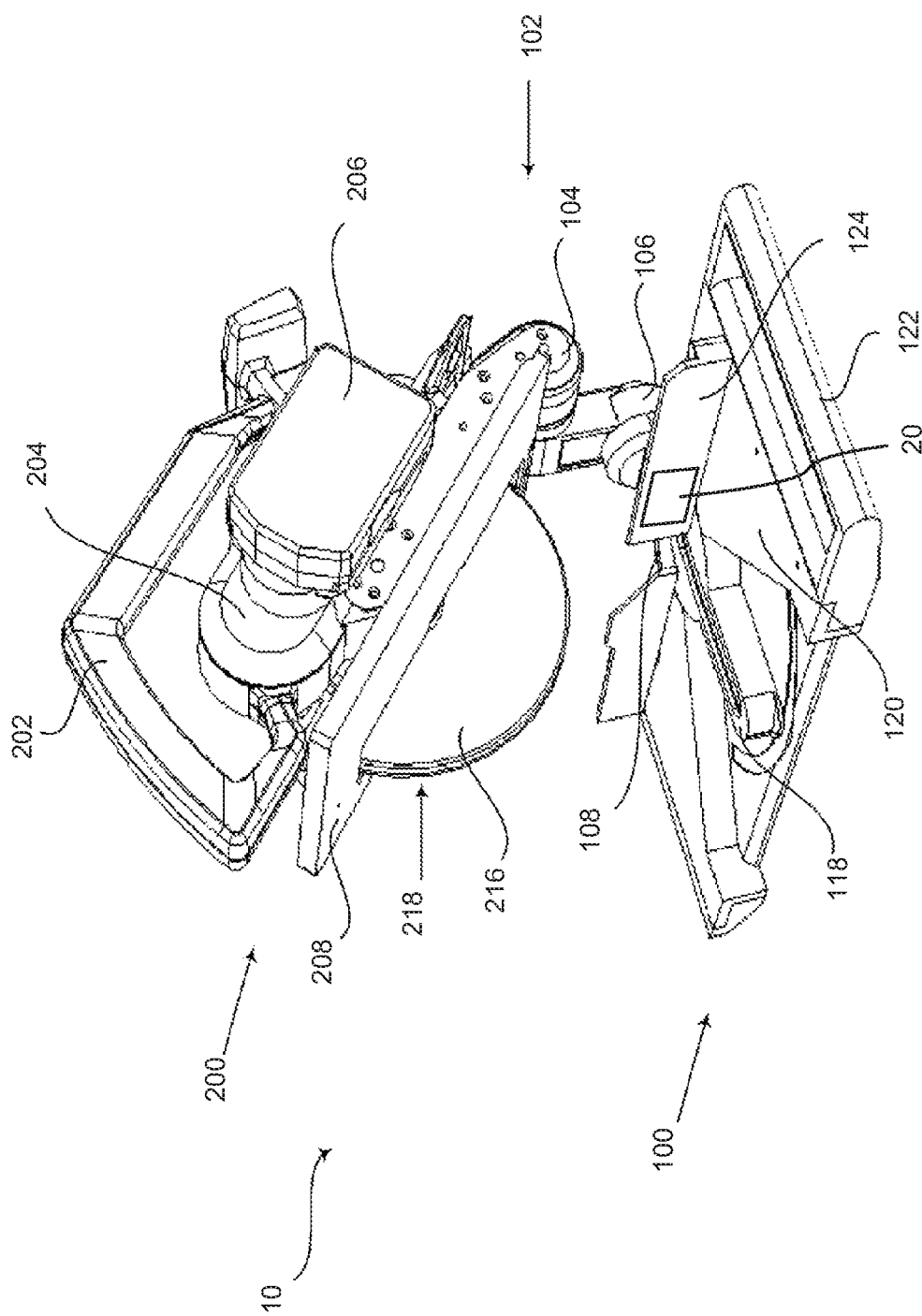

One embodiment of a power tool comprising an optical measurement device is shown in FIGS. 1-3. In particular, FIGS. 1-3 depict the power tool as a miter saw assembly 10 having an optical measurement device 20. As noted above, the measurement device 20 may be suitable for a wide range of different tools. In such embodiments, the measurement device 20 may be integrated into decks, fences, housings, bases, etc. of the other tools in a manner consistent with the appended claims.

As shown, the miter saw assembly 10 may include a circular saw 200 coupled to a miter base 100. The circular saw 200 may include a circular blade 218, a motor 204, and a power supply 206. The motor 204 may be operable to rotate the circular blade 218. The power supply 206 may be operable to provide power to the motor 204.

The miter base 100 may include a base 120 and a support arm 102. The support arm 102 may comprise a vertical pivot 104, a bevel pivot 106 (if the miter saw assembly 10 is a compound miter saw, for example), and a horizontal pivot 108. In some embodiments, such as if the miter saw assembly 10 is a sliding compound miter saw, the support arm 102 may comprise sliding rails (not shown) such that the circular saw 200 may be pushed towards the rear of the miter base 100 and/or pulled towards the front of the miter base 100 while in the cutting position. The vertical pivot 104 may permit the support arm 102 and attached circular saw 200 to pivot downward to a cutting position and upward from the cutting position. The bevel pivot 106 may permit the support arm 102 and attached circular saw 200 to tilt sideways to provide beveled cuts. The horizontal pivot 108 may permit the support arm 102 and attached circular saw 200 to rotate horizontally to provide angled cuts.

The base 120 may comprise a blade receiving miter table 118, a handle 122, and a fence 124. The handle 122 may be grasped to transport the miter saw assembly 10. The blade receiving miter table 118 may be operable to receive a cutting blade 218 of the circular saw 200 as the circular saw 200 vertically pivots downward to a cutting position. In some embodiments, such as if the miter saw assembly 10 is a sliding compound miter saw, the blade 218 of the circular saw 200 may be pushed within the blade receiving miter table 118 towards the rear of the miter base 100 and/or pulled within the blade receiving miter table 118 towards the front of the miter base 100 while in the cutting position. The blade receiving miter table 118 may be operable to rotate horizontally about the horizontal pivot 108 in unison with the support arm 102 when the circular saw 200 is rotated horizontally to change an angle of a cut.

The fence 124 may be operable to provide a precise cutting angle between the plane of the blade 218 and the plane of a workpiece edge when the workpiece is held against the fence 124. The default angle of the fence 124 in relation to the blade 218 of the circular saw 200 may be ninety degrees. The angle of the fence 124 in relation to the blade 218 may be adjusted by, for example, horizontally rotating the circular saw 200 coupled to the coupling arm about the horizontal pivot 108.

The circular saw 200 may comprise a handle 202, a motor 204, a power supply 206, a foot 208, a dust port 210, a blade guard lever 212, a housing 214, a blade guard 216, and a blade 218. An operator may grasp the handle 202 to operate the circular saw 200 and maneuver the circular saw 200 as guided by the support arm 102. The handle 202 may include a grip, such as rubber, grooves, or any suitable material or texture. The handle 202 may include buttons, triggers, or the like for activating the circular saw 200. The motor 204 may be powered by the power supply 206 and may be operable to rotate the blade 218 when activated. The power supply 206 may be an alternating current (AC) power supply (e.g., through a cord from a plug that mates with a wall socket), a direct current (DC) power supply (e.g., a battery), or any suitable power supply.

The foot 208 may be operable to rest on a surface that is being cut. Particularly, the foot 208 may be generally parallel with the surface being cut when the circular saw 200 is pivoted downward into the cutting position. In some embodiments, the foot 208 may automatically adjust to remain generally parallel with the surface being cut as the circular saw 200 is tilted sideways by the bevel pivot 106. The foot 208 may be movable to adjust a depth of a cut. The dust port 210 may extend from the housing 214 and may be operable to discharge dust formed during a sawing operation. A dust bag (not shown) may be attached to the dust port 210 to collect the dust discharged through the dust port.

The blade 218 may comprise a circular blade that is rotated by the motor 204 to cut a workpiece. In certain embodiments, different blades 218 may be used for cutting different workpiece materials, such as wood, plastic, metal, or any suitable material. The different blades 218 may comprise teeth of various sizes and configurations based on the application. The blade 218 may be metal, such as steel, titanium, or any suitable material. The blade 218 may be removable and replaceable with other circular blades. For example, a blade 218 may be removed and replaced if the workpiece material changes or if the blade is worn, among other things.

Figure 4:
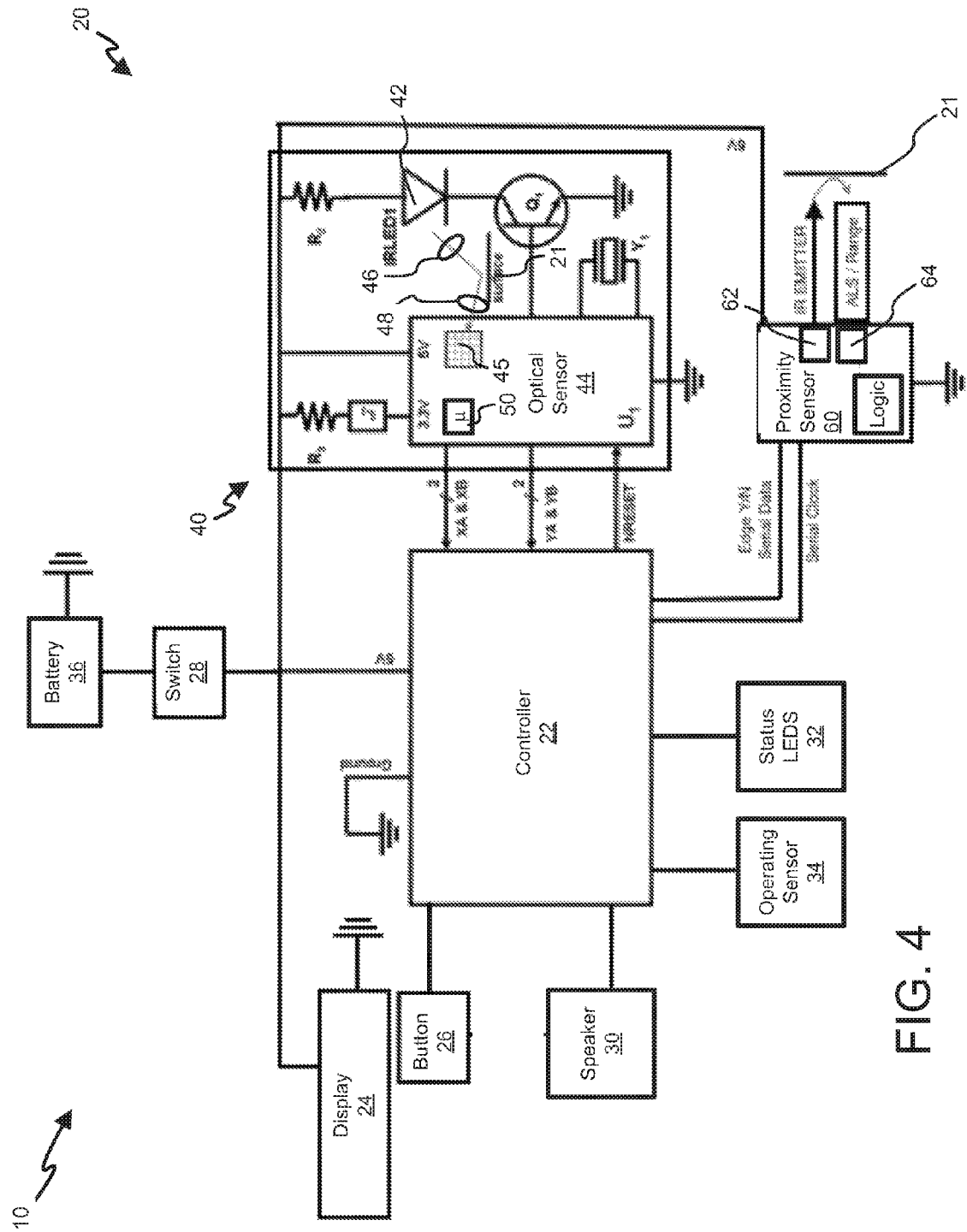
FIG. 4 provides a block diagram of a control system of the power tool shown in FIGS. 1-3.

The miter saw assembly 10 may comprise an optical measurement device 20 that aids an operator in positioning a workpiece such that the blade 218 cuts the workpiece at a desired location. To this end, the miter saw assembly 10 may include a control system 18 as shown in FIG. 4. The control system 18 may include a controller 22 coupled to one or more measurement devices 20 that positioned in the feed path of the miter saw assembly. In particular, the measurement devices 20 may be integrated, mounted, or otherwise associated with the fence 124 of the miter saw assembly 10. In particular, the measurement devices 20 may be positioned such that the measurement devices 20 interact with a surface 21 of the workpiece as the workpiece traverses the fence 124. In other embodiments, the measurement devices 20 may be placed in the base 100 of the assembly 10 such that the measurement devices 20 interacts with a bottom surface of the workpiece as the workpiece traverses the base 100. The measurement devices 20 may be positioned on the fence 124 on either side of the blade 218. Furthermore, the measurement devices 20 may be positioned in an array up the fence 124 or across the base 100. In other embodiments, the measurement devices 20 may be mounted in a manner that permits repositioning the measurement devices 20 in a manner suited for a particular workpiece.

A plurality of measurement devices 20 may provide redundancy to ensure accuracy of obtained measurements by measuring the workpiece in multiple places, simultaneously or concurrently, and comparing obtained measurements to ensure proper continuity during the measurement process. Placement of the measurement devices 20 may also be based on preferences of the operator. For instance, an operator of the power tool may prefer to feed a workpiece to the blade 218 from the left side or from the right side, in which case the measurement devices 20 may be positioned only on the preferred side of the blade 218.

The controller 22 may comprise a microcontroller comprising a microprocessor, memory, and input/output ports for interacting with various input/output (I/O) devices. In general, the microprocessor may execute instructions of a control program stored in memory in order to obtain measurements via signals received from measurement devices 20 and control operation of the miter saw assembly 10. Further example details of such control operations are presented below with respect to the flowcharts of FIGS. 5 and 6.

As shown, the controller 22 may be coupled to a measurement device 20, a display 24, a zero button 26, a power switch 28, a speaker 30, status LEDs 32, and operating sensor 34. A battery 36 or other power source such as the power supply 206 may power the components of the control system 18 when the power switch 28 is in an on position. While FIG. 4 depicts the controller 22 coupled to various I/O devices, the controller 22 may be coupled to a wide array of additional or alternative I/O devices such as a touch panel, buttons, dials, switches, a digital read out displays, light emitting diode (LED) displays, liquid crystal displays (LCDs), LEDs, lamps, accelerometers, etc., in order to monitor operation of the miter saw assembly 10 and to appropriately interact with an operator of the miter saw assembly 10.

The display 24 may present measurements obtained via the measurement device 20. The speaker 30 may provide audible feedback such as messages or warnings in the form of audible tones or spoken words. The status LEDs 32 may present visual feedback as to the operating state of the miter saw assembly 10. For example, the status LEDs 32 may include an LED that is illuminated to indicate whether the measurement device 20 is powered and an LED that is illuminated to indicate whether an error occurred while generating a measurement of the workpiece.

In some embodiments, the controller 22 may present via the display 24 and/or status LEDs 32 a detected travel direction, e.g., left or right, of the workpiece with respect to the measurement devices 20. The controller 22 may further record and present the measurement of the workpiece at the time the workpiece was cut. The controller 22 may record the measurement in response to detecting the saw 200 cutting the workpiece. Such detecting may be based on directly sensing activation of the button, switch, etc., in the handle 202 of the saw 200. Such detecting may also be achieve indirectly by way of an operating sensor 34 such as an accelerometer or other sensor that is capable of sensing operation of the saw 200. The recorded and presented measurement may guide an operator of the saw 200 in cutting cut another workpiece to the same length.

Each of the measurement devices 20 may include an optical displacement sensor 40 and an optical proximity sensor 60 that may cooperate to provide a measurement of the workpiece so that a tool may be applied at a desired location of the workpiece. The displacement sensor 40 may include a light source 42 such as a light emitting diode (LED), and an image sensor 44 such as a CMOS image sensor, lenses 46, 48, and controller 50. The lens 46 may be configured to direct light from the light source 42 toward a surface of the workpiece such that the directed light hits the workpiece at an angle. The lens 48 may be configured to focus light reflected from the surface of the workpiece onto a pixel array 45 of the image sensor 44. Illumination of the surface of the workpiece at an angle may help increase the contrast of tiny textures on the surface of the workpiece and thus images captured by the image sensor 44. In one embodiment, the pixel array 45 comprises 324 pixels in an 18 pixel×18 pixel array.

The controller 50 of the image sensor 40 may compare successive images captured by the pixel array 45 in order to detect a displacement or offset between successive images associated with movement of the workpiece. In some embodiments, the image sensor 40 refreshes and provides new image data every 1500th of a second. In order to reduce computational complexity, the controller 50 may compare successive images based on a reference window (e.g., a 5 pixel×5 pixel window) taken from the center of an image. The controller 340 may scan a previously captured image to identify a window (e.g., a 5 pixel×5 pixel window) that provides the best match to the reference window. Once the controller 50 identifies the best matching window, the controller 50 may generate an output indicative of a displacement of the identified window with respect to the reference window. Since such displacement is a result of movement of the workpiece, the generated output is indicative of the displacement or distance traveled by the workpiece between image refreshes.

As noted above, the measurement device 20 may further include a proximity sensor 60. In some embodiments, the proximity sensor 60 may be implemented in a similar manner as the displacement sensor 40. However, in some embodiments, the proximity sensor 60 may use a different implementation that may be less expensive. In particular, the proximity sensor 60 may comprise a light source 62 such as an infrared emitter and a light detector 64. Control logic 64 of the proximity sensor 60 may detect an edge of the workpiece based upon a transition of the light detector 64 receiving or not receiving infrared light emitted by the light source 350 due to such emitted light reflecting or not reflecting off a surface of the workpiece. The controller 22 may utilize the combination of edge detection provided by the proximity sensor 60 and displacement measurement provided by the displacement sensor 50 to monitor and report the length of a workpiece as the workpiece is fed toward the blade 216.

In some embodiments, the measurement device 20 is calibrated to account for a distance between the measurement device 20 and the blade 218. Moreover, the calibration may account for differences in cutting width or kerf of different blades 218. The calibration or zeroing process may be accomplished in a number of different manners.

Figure 5:
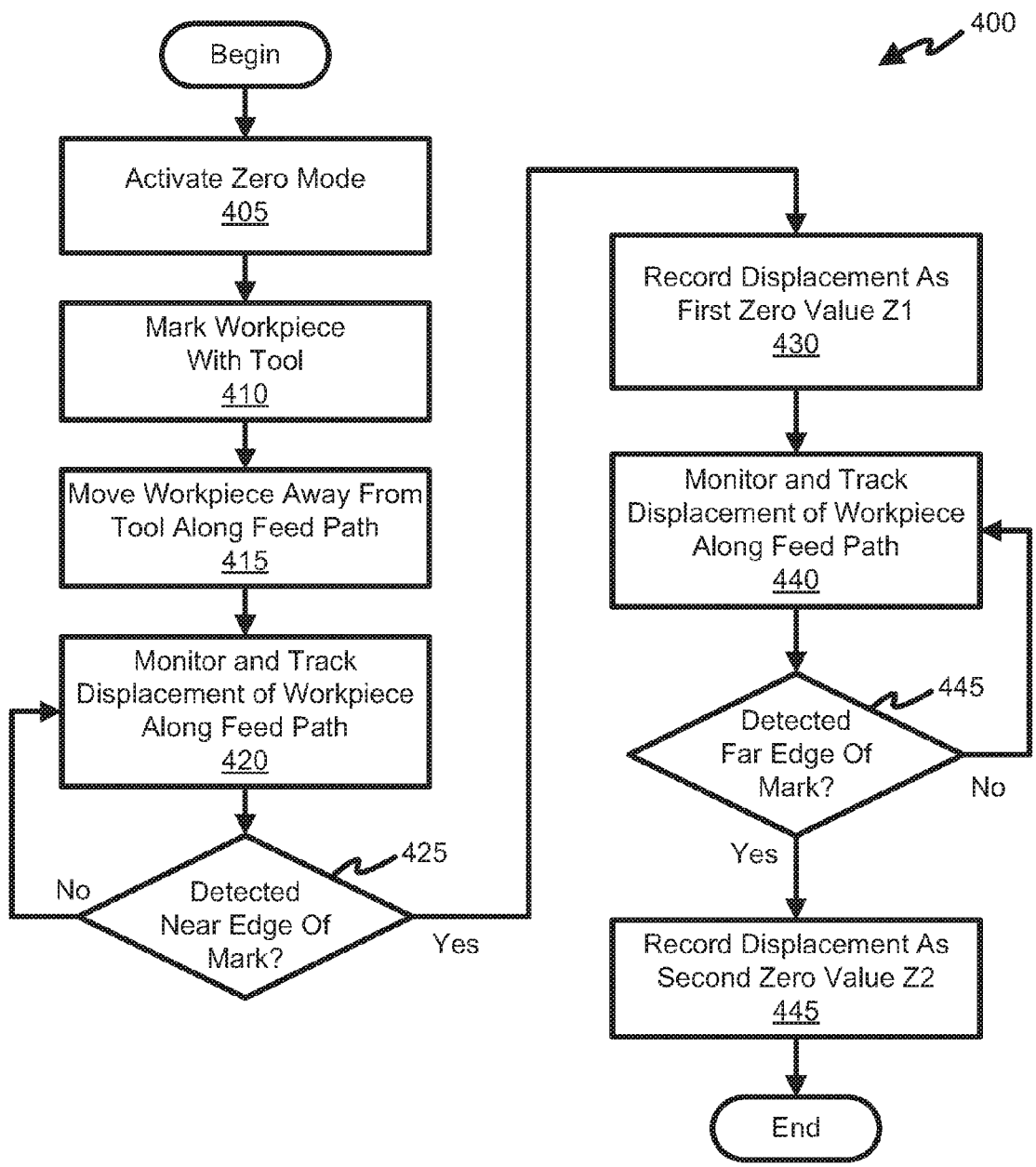
FIG. 5 provides a flowchart of an example zeroing process implemented by the control system of FIG. 4.

Referring now to FIG. 5, a flowchart of one embodiment of such a zeroing process 400 is shown. In general, the zeroing process 400 provides a measurement device 22 with the distance from the measurement device 22 to a far face of the saw blade 218 that faces away from the measurement device 22. Such distance accounts for the kerf of the blade 218 thus allowing calibration for different blades being used with the saw 200.

At 405, a zero mode of the miter assembly 100 is activated. For example, a user of the miter assembly 100 may activate the zero mode by pressing or pressing and holding a zero button of the control panel 26. At 410, the tool or blade 218 is applied to a scrap workpiece in order to mark the workpiece in a manner that results in the scrap workpiece having a near edge and far edge reflective of the width of the tool. For example, the blade 218 may partially cut (e.g., half way through the work piece) towards an end of the workpiece to obtain a mark reflective of the kerf of the blade 218. At 415, the scrap workpiece is fed in reverse, away from the blade 218 and across the measurement device 22. In response to feeding the scrap workpiece across the measurement device 22, the displacement sensor 24 of the measurement device 22 at 420 may track displacement of the scrap workpiece as it travels away from the blade 218. At 425, the proximity sensor 26 of the measurement device 22 may determine whether a first edge of the partial cut has been detected. If the first edge has not been detected, the displacement sensor 24 at 420 may continue to track displacement of the workpiece as the workpiece travels away from the blade 218. If the first edge is detected, then the measurement device 22 at 430 may record the displacement of the workpiece to the first edge of the partial cut as a first zero value Z1. The first edge of the partial cut corresponds to a near face of the blade 218. As such, the first zero value Z1 corresponds to a distance between the measurement device 22 and the near face of the blade 218.

The displacement sensor 24 at 440 may continue to track displacement of the scrap workpiece as it travels away from the blade 218. At 445, the proximity sensor 26 may determine whether a second edge of the partial cut has been detected. If the second edge has not been detected, the displacement sensor 24 at 440 may continue to track displacement of the workpiece as the workpiece travels away from the blade 218. If the second edge is detected, then the measurement device 22 at 450 may record the displacement of the workpiece to the second edge of the partial cut as a second zero value Z2. The second edge of the partial cut corresponds to a far face of the blade 218. As such, the second zero value Z2 corresponds to a distance between the measurement device 22 and the far face of the blade 218.

In this manner, the miter assembly 100 may obtain the distance between the measurement device 22 and the near face of the blade, i.e., distance Z1. Similarly, the miter assembly 100 may obtain the distance between the measurement device 22 and the far face of the blade, i.e., distance Z2. Moreover, the width of the cut or kerf of the blade 218 may be obtained by subtracting the distance Z1 to the near edge from the distance Z2 to the far edge of the partial cut. Furthermore, the measurement device 22 may utilize the zero values Z1, Z2 to adjust measurement readings of a workpiece to account for an offset between the measurement device 22 and the relevant cutting face of the blade 218.

One alternative to the zeroing process 400 is for the miter assembly 100 to come zeroed from the factory as the distance from the measurement device 22 to the near side of the blade. The user may then manually enter via the control panel 26 the width of the blade 218, a part number for the blade 218, or some other identifying information from which the measurement device 22 may ascertain the width of the blade 218.

For another alternative, the miter saw 200 may be configured such that the face of the saw blade mandrel is on the side opposite or distal from the measurement device 22. In such an configuration, the width of the blade 218 would not affect the location of the far side of the blade 218 but location of the near side of the blade 218 would vary based on the blade width.

Another approach for zeroing the measurement is based on the fact that the workpiece is already zeroed after a cut. After the operator has made the a first cut on a particular workpiece, if the remaining work piece is not removed from flush contact with the fence 124 after the cut, the controller 22 may recognize that a cut has occurred and may re-zero off the end of the workpiece. The workpiece may now be fed again.

In one embodiment, the fence 124 intersects a vertical pivot axis of the saw 200. As such, the distance from the measurement device 20 to the relevant face of the blade 218 does not change when the miter angle is adjusted. However, for embodiments in which the distance may change as a result of adjusting the angle of the cut, re-executing the zeroing process may be warranted to ensure proper measurement. To this end, the control system 18 may include further sensors that may detect a change in the miter angle. The control system 18 may then warn the operator via display 24 and/or statue LEDs 34 that a performing a zeroing process may be warranted.

Figure 6:
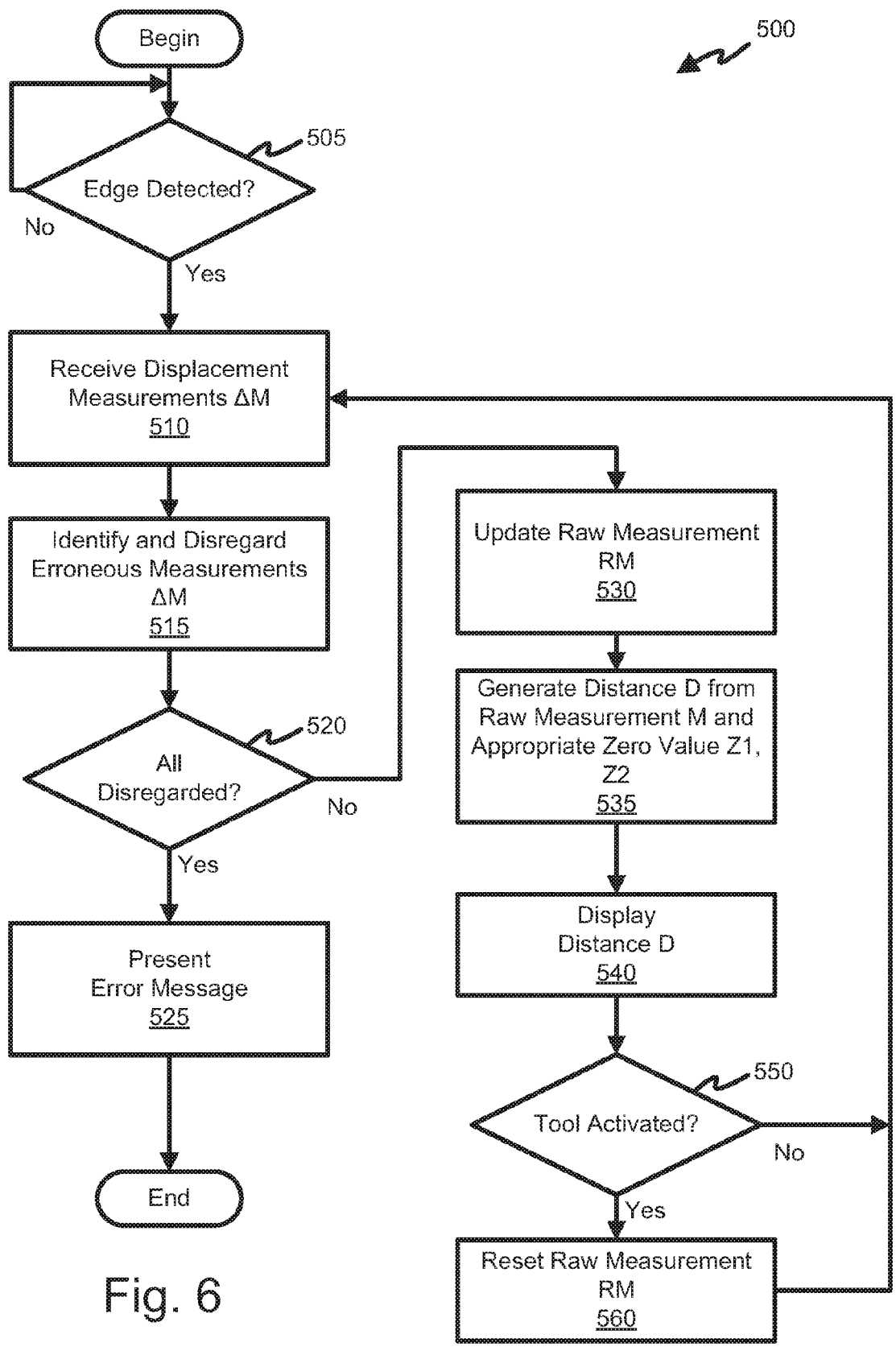
FIG. 6 provides a flowchart of an example operation of the control system of FIG. 4.

Referring now to FIG. 6, a flowchart depicting a control process implemented by the controller 22 of the miter assembly 10 is shown. At 505, the controller 22 may determine based on detection signals received from proximity sensors 60 of one or more measurement device 20 whether an edge of a workpiece has been detected. If an edge has not been detected, the controller 22 at 505 may continue to monitor for the detected edge. At 510, the controller 22 may receive displacement measurements $\Delta M$ from displacement sensors 40 of one or more measurement devices 20.

The controller 22 at 515 may identify and disregard displacement measurements $\Delta M$ that are likely erroneous. Multiple displacement sensors 40 may ensure accurate and consistent readings by way of adding redundancy and permitting the controller 22 to compare multiple readings. Multiple displacement sensors 40 may also ensure accurate measurements are obtained with various height/shape workpieces. For example, in a single displacement sensor embodiment, erroneous readings may occur where the workpiece is not wide or tall enough to be in position with the displacement sensor 40. Also, since feeding the workpiece in some embodiments is a manual process, the operator may pivot or "seesaw" the workpiece in such a way that during the measurement phase, one or more displacement sensors 40 may lose contact with the workpiece and generate erroneous readings. Multiple displacement sensors 40 may also address workpiece irregularities, such as wood knots, defects, dust, etc. that may impede a single displacement sensor 40 from accurately obtaining measurement readings.

The controller 22 at 515 may utilize various techniques to identify erroneous displacement measurements $\Delta M$. For example, the controller 22 may determine that a displacement measurement $\Delta M$ is erroneous if it is not within a certain percentage or range of displacement measurements $\Delta M$ received from other displacement sensors 40. Further, the controller 22 may determine a displacement measurement $\Delta M$ from a displacement sensor 40 is erroneous if not within a certain percentage or range of the prior displacement measurement $\Delta M$ received from the same displacement sensor 40.

At 520, the controller 22 may determine whether all displacement measurements $\Delta M$ have been disregarded. If all have been disregarded, the controller 22 at 525 may cause the display 24, the speaker 30, and/or one or more of the status LEDs 32 to present an error message or warning to the operator of the miter saw assembly. However, if the controller 22 determines that all have not been disregarded, then the controller 22 at 530 may update a raw measurement RM based on the obtained displacement measurements $\Delta M$. In one embodiment, the controller 22 may average the retained displacement measurements $\Delta M$ to obtain an average displacement measurement $\Delta AM$. The controller 22 may then add the average displacement measurement $\Delta AM$ to the raw measurement RM to obtain and updated raw measurement RM.

The controller 22 at 535 may then adjust the raw measurement to account for the distance between the proximity sensor 60 and the relevant face of the blade 218. To this end, the controller 22 may determine the direction of travel (e.g., left-to-right feed, or right-to-left feed) of the workpiece based on the received displacement measurements $\Delta M$. The proximity sensor 60 may be positioned to the right of the blade 218. In such an embodiment, if the workpiece is fed to the blade 218 right-to-left, then the workpiece passes the proximity sensor 60 prior to reaching the blade 218. As such, the controller 22 may determine that the far face of the blade 218 is the relevant face for measurement purposes. The controller 22 may therefore obtain a distance measurement D of the workpiece by subtracting from the raw measurement RM the distance Z2, which corresponds to the distance from the proximity sensor 60 to the far face of the blade 218. Conversely, if the workpiece is fed to the blade 218 left-to-right, then the workpiece passes the blade 218 before reaching the proximity sensor 60. As such, the controller 22 may determine that the near face of the blade 218 is the relevant face for measurement purposes. The controller 22 may therefore obtain the distance measurement D of the workpiece by subtracting from the raw measurement RM the distance Z1, which corresponds to the distance from the proximity sensor 60 to the near face of the blade 218.

The controller 22 at 540 may update the display 24 to present the obtained distance measurement D. The controller 22 at 550 may determine whether the power tool has been activated. As noted above, the controller 22 may make such determination based upon whether a trigger or button in the handle 202 of the saw 200 is actuated. In other embodiments, the controller 22 may make such determination based on signals received from the operating sensor 34. If the power tool has not activated, the controller 22 returns to 510 in order to receive further displacement measurements $\Delta M$ for further updates of the distance measurement D. However, if the power tool has been activated, the controller 22 at 560 resets the raw measurement RM before returning to 510 in order to receive displacement measurements $\Delta M$ for a new distance measurement D.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. An apparatus, comprising:
   a tool to be applied to a workpiece;
   an optical measurement device in a feed path of the tool, the optical measurement device configured to generate a plurality of displacement measurements indicative of displacement of the workpiece as the workpiece traverses the feed path toward the tool; and
   a controller configured to generate a distance measurement of the workpiece based on the plurality of displacement measurements;
   wherein the distance measurement indicates a distance between an end of the workpiece and a location of the workpiece to which the tool is to be applied; and
   wherein the optical measurement device comprises an optical displacement sensor configured to generate a displacement measurement of the plurality of displacement measurements based upon a detected offset between a reference window of pixels in a first image from the plurality of images of the workpiece and a matching window of pixels in a second image from the plurality of images.

2. The apparatus of claim 1, wherein the optical displacement sensor is configured to generate the plurality of displacement measurements.

3. The apparatus of claim 2, wherein the optical displacement sensor comprises a light source configured to direct light upon a surface of the workpiece as the workpiece traverses the feed path and an image sensor configured to generate a plurality of images of the workpiece based on the light directed upon the surface of the workpiece.

4. The apparatus of claim 1, wherein
   the optical measurement device further comprises an proximity sensor configured to detect the edge of the workpiece as the workpiece traverse the feed path and generate a signal indicative of the detected edge; and
   the controller is further configured to generate the distance measurement for the workpiece based on the signal indicative of the detected edge.

5. The apparatus of claim 4, wherein:
   the proximity sensor is positioned at a distance from the tool; and
   the controller is further configured to adjust the distance measurement for the workpiece based the distance the proximity sensor is from the tool.

6. The apparatus of claim 4, wherein the proximity sensor comprises a light source and light detector configured to detect light from the light source that is reflected off a surface of the workpiece.

7. The apparatus of claim 1, wherein the tool comprises a miter assembly having a saw and a miter base with a fence against which the workpiece is positioned.

8. The apparatus of claim 7, wherein the optical measurement device is in the fence and interacts with the workpiece as the workpiece traverses the fence.

9. The apparatus of claim 7, wherein the optical measurement device is in miter base and interacts with the workpiece as the workpiece traverses the miter base.

10. The apparatus of claim 1, further comprising a display configured to present the distance measurement of the workpiece.

11. An miter assembly, comprising:
    a miter base having a fence against which a workpiece is placed;
    a saw coupled to the miter base;
    an optical displacement sensor configured to generate a plurality of displacement measurements indicative of displacement of the workpiece as the workpiece traverses the fence toward the saw; and
    a controller configured to generate a distance measurement of the workpiece based on the plurality of displacement measurements, wherein the distance measurement indicates a distance between an end of the workpiece and a location of the workpiece to which the saw is to be applied;
    wherein the optical displacement sensor is further configured to generate a displacement measurement of the plurality of displacement measurements based upon a detected offset between a reference window of pixels in a first image from the plurality of images and a matching window of pixels in a second image from the plurality of images.

12. The miter assembly of claim 11, wherein the optical displacement sensor comprises a light source configured to direct light upon a surface of the workpiece as the workpiece traverses the feed path and an image sensor configured to generate the plurality of images of the workpiece based on the light directed upon the surface of the workpiece.

13. The miter assembly of claim 11, further comprising:
    an edge sensor configured to detect an edge of the workpiece as the workpiece traverse the fence and generate a signal indicative of the detected edge; and
    the controller is further configured to generate the distance measurement for the workpiece based on the signal indicative of the detected edge.

14. The miter assembly of claim 13, wherein:
    the edge sensor is positioned at a distance from the tool; and
    the controller is further configured to adjust the distance measurement for the workpiece based the distance the sensor is from the tool.

15. The miter assembly of claim 13, wherein the edge sensor comprises a light source and a light detector configured to detect light from the light source that is reflected off a surface of the workpiece.

16. The miter assembly of claim 13, further comprising a display configured to present the distance measurement of the workpiece.

17. A method of zeroing an optical measurement device of a tool, comprising:
    moving a workpiece along a feed path into position of the tool; applying the tool to the workpiece to obtain a mark having a near edge and a far edge representative of a width of the tool;
    moving the workpiece along the feed path away from the tool; measuring, with a displacement sensor positioned along the feed path, a distance traveled by the workpiece as the workpiece is moved away from the tool; and
    detecting, with an optical sensor positioned along the feed path, the far edge of the mark and recording the associated distance traveled as a zero value;
    wherein said measuring comprises generating a plurality of images of the workpiece as the workpiece is moved away from the tool, and generating a displacement measurement of a plurality of displacement measurements based upon a detected offset between a reference window of pixels in a first image from the plurality of images and a matching window of pixels in a second image from the plurality of images.

18. The method of claim 17, further comprising, before said detecting the far edge, detecting the near edge of the mark with the optical sensor and recording the associated distance traveled as another zero value.

* * * * *